United States Patent
Dinnage et al.

(10) Patent No.: US 6,622,508 B2
(45) Date of Patent: Sep. 23, 2003

(54) METHOD FOR HEAT AND HUMIDITY EXCHANGE BETWEEN TWO AIR STREAMS AND APPARATUS THEREFOR

(75) Inventors: Paul A. Dinnage, Stratham, NH (US); Wolfgang Krause, Wentorf (DE); Dietmar Müller, Winsen (DE)

(73) Assignee: Munters Europe AB, Sollentuna (SE)

( * ) Notice: Subject to any disclaimer, the term of this patent is extended or adjusted under 35 U.S.C. 154(b) by 0 days.

(21) Appl. No.: 10/018,832
(22) PCT Filed: Apr. 18, 2001
(86) PCT No.: PCT/SE01/00852
§ 371 (c)(1), (2), (4) Date: Mar. 25, 2002
(87) PCT Pub. No.: WO01/79763
PCT Pub. Date: Oct. 25, 2001

(65) Prior Publication Data
US 2002/0129614 A1 Sep. 19, 2002

(30) Foreign Application Priority Data
Apr. 18, 2000 (SE) .................................. 0001443

(51) Int. Cl.⁷ ........................... F25D 17/06; F25D 23/00
(52) U.S. Cl. .................................. 62/271; 62/93; 62/94
(58) Field of Search .......................... 62/271, 94, 114, 62/238.3

(56) References Cited

U.S. PATENT DOCUMENTS

| | | |
|---|---|---|
| 2,926,502 A | 3/1960 | Munters et al. ............... 62/94 |
| 3,009,684 A | 11/1961 | Munters ..................... 257/267 |
| 3,398,510 A | 8/1968 | Pennington .................. 55/163 |
| 3,470,708 A | 10/1969 | Weil et al. ................... 62/271 |
| 3,844,737 A | 10/1974 | Macriss et al. ................ 55/34 |
| 4,014,380 A | 3/1977 | Rush et al. .................... 165/2 |
| 4,398,927 A | 8/1983 | Asher et al. ................... 55/34 |
| 4,729,774 A | 3/1988 | Cohen et al. ................. 55/181 |
| 5,325,676 A | * 7/1994 | Meckler ........................ 62/94 |
| 5,471,852 A | * 12/1995 | Meckler ...................... 62/271 |
| 5,860,284 A | * 1/1999 | Goland et al. ................. 62/94 |

FOREIGN PATENT DOCUMENTS

EP 0846923 6/1998

* cited by examiner

Primary Examiner—Chen Wen Jiang
(74) Attorney, Agent, or Firm—Dickstein Shapiro Morin & Oshinsky, LLP

(57) ABSTRACT

An apparatus and method for heat and humidity exchange between two air streams, one hot and one humid. A first of the air streams is fed from the interior of a building to the ambient air and a second of the air streams is fed from the ambient air to the interior of the building. The first air stream is cooled and transferred through a heat exchanger, to a heater and a dehumidifier before being exhausted to the ambient air. The second air stream is transferred through the dehumidifier and the heat exchanger, whereupon it is cooled in a cooling device before being transferred into the interior to the building. Before being fed to the dehumidifier, the second air stream is caused to exchange heat and humidity with the first air stream before the latter is fed into the heat exchanger.

14 Claims, 3 Drawing Sheets

METHOD FOR HEAT AND HUMIDITY EXCHANGE BETWEEN TWO AIR STREAMS AND APPARATUS THEREFOR

BACKGROUND OF THE INVENTION

The invention relates to a method for heat and humidity exchange between two air streams, one of which being hot and humid, at least during a first part of the year, wherein a first of said air streams is fed from the interior of a building to the ambient air and a second of said air streams is fed from said ambient air to the interior of said building, whereby said first air stream is cooled and thereafter transferred through a heat exchanger, whereupon it is transferred to a heater and thereafter transferred through a dehumidifier before being exhausted to the ambient air, whereas said second air stream is transferred through said dehumidifier and thereafter through said heat exchanger, whereupon it is cooled in a cooling device before being transferred into the interior of said building.

The invention relates also to an apparatus for heat and humidity exchange between two air streams, one of which being hot and humid, at least during a first part of the year, wherein a first of said air streams is adapted to be fed from the interior of a building to the ambient air and a second of said air streams is adapted to be fed from said ambient air to the interior of said building, said apparatus comprises a housing, divided into first and second compartments, means for transportation of the two air streams separately in said compartments, a device for cooling and humidification of the first air stream, a sensible heat exchanger for exchange of heat between the two air streams, a heater for heating said first air stream, and a dehumidifier for drying said second air stream, wherein said first air stream is adapted to be transferred through said dehumidifier for regenerating said dehumidifier.

Apparatuses and methods for heat and humidity exchange between two air streams are known. Such apparatuses and methods are used for improving the indoor air in, for instance, small houses and buildings, i.e. to cool and to dry the outdoor air which is fed into a building during the summer and to heat and humidify said air during the winter before said air is transferred into the building.

However, there is a problem when the outdoor air is hot and humid, i.e. when the temperature is above 35° C., and the content of water in the outdoor air is larger than 11 g/kg air, since the known apparatuses can not treat such air in the proper way.

Also, there is a problem with the energy consumption, which is often quite high. The energy is used to either regenerate a dehumidifier during the summer or to heat the supply air during the winter. Moreover, the production of energy may result in air pollution, and especially in undesired outlet of $CO_2$.

Therefore, it would be desirable to provide a method and an apparatus by which it is possible to save energy.

SUMMARY OF INVENTION

The object of the present invention is to eliminate the above-mentioned drawbacks and to provide a method and an apparatus which will operate under the above conditions and by which it is also possible to minimize the energy consumption.

According to a first aspect of the invention this object is achieved in that said second air stream, before being fed to said dehumidifier, is caused to exchange heat and humidity with said first air stream before the latter is fed into said heat exchanger.

According to a second aspect of the invention this object is achieved in that an enthalpy exchange device is provided in said housing and adapted to treat said second air stream and said first air stream for exchange of heat and humidity between said air streams, before said second air stream is transferred through said dehumidifier and said first air stream is transferred through said humidifier, respectively.

BRIEF DESCRIPTION OF THE DRAWINGS

A non-limiting example of the invention will now be described with reference to the drawings, in which.

To be able to better understand the method according to the invention an apparatus for carrying out said method will be described first.

DETAILED DESCRIPTION OF THE INVENTION

Figure 1:
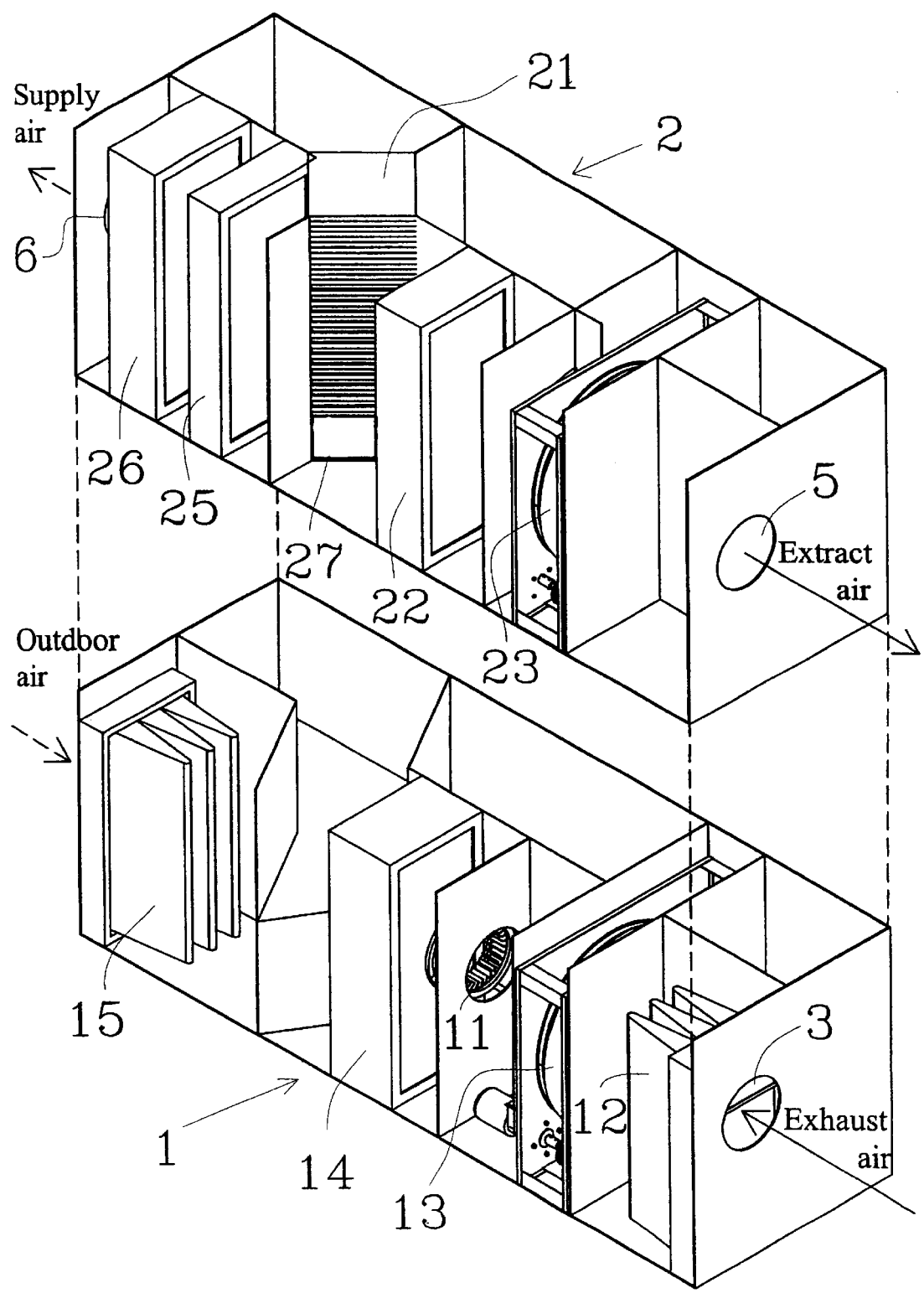
FIG. 1 is a perspective view of an apparatus according to the invention comprising a lower housing unit and an upper housing unit, shown separated from each other.

FIG. 1 shows an apparatus according to the invention for heat and humidity exchange between two air streams, wherein a first of said air streams is fed from the interior of a building to the ambient air and a second of said air streams is fed from said ambient air to the interior of said building.

Figure 2:
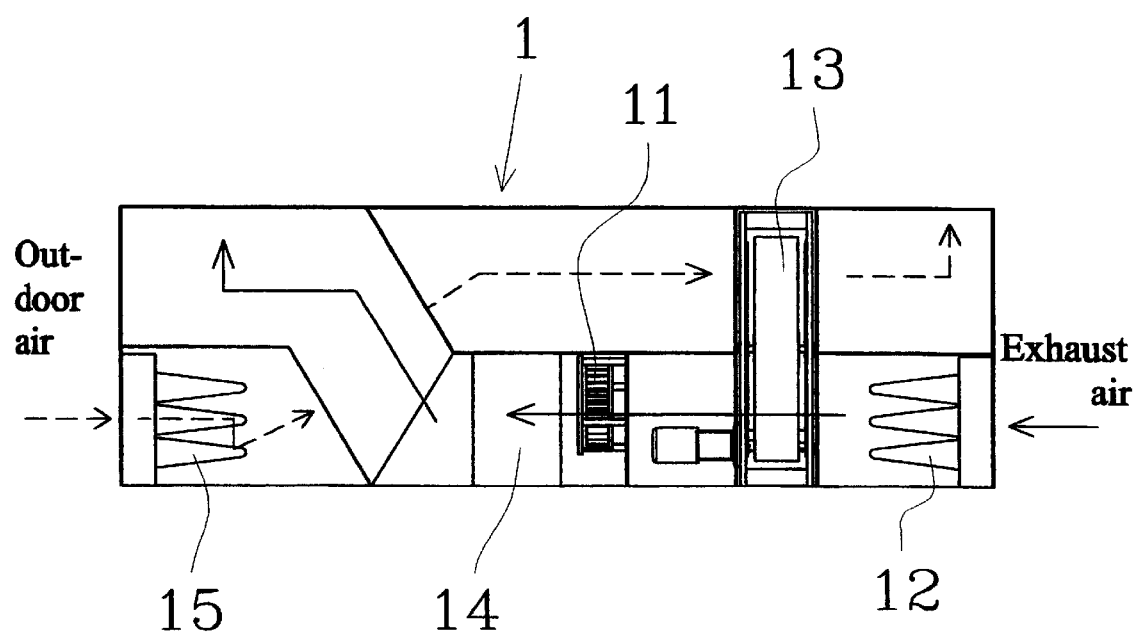
FIG. 2 is a view from above of the lower housing unit of the apparatus according to the invention and FIG. 3 is a view from above of the upper housing unit of the apparatus according to the invention.
Figure 3:
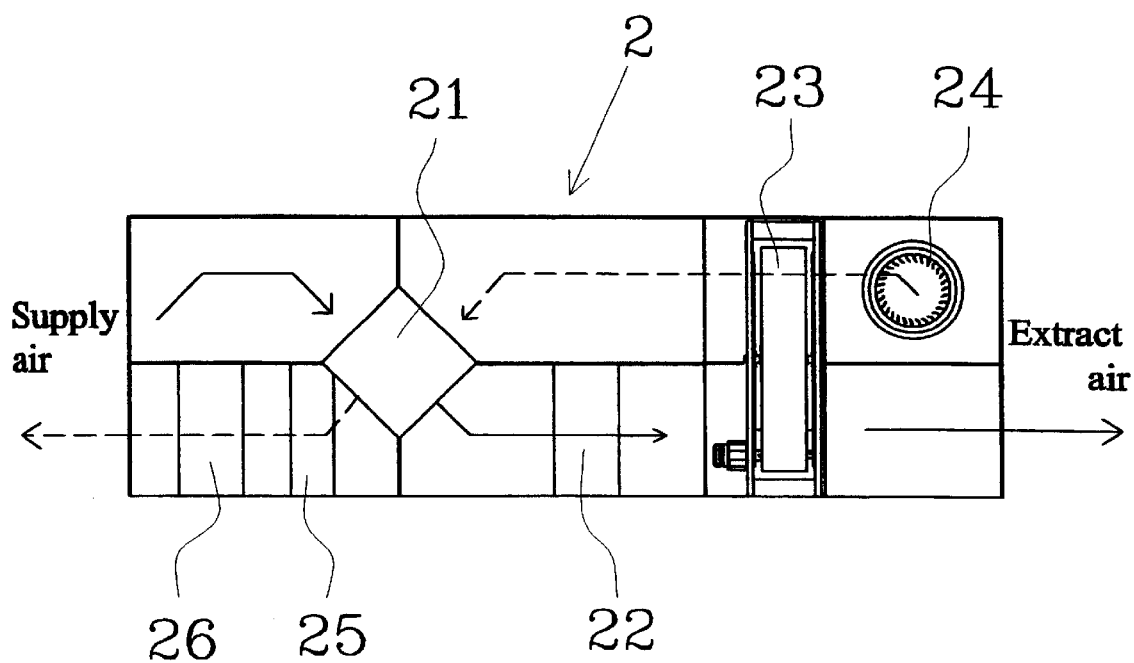

As seen in FIGS. 1–3, in a preferred embodiment of the invention, the apparatus comprises a housing 1,2 divided into a lower housing unit 1 and an upper housing unit 2. Each of said housing units are also divided into first and second compartments, respectively, for transferring the two air streams separately in said housing units.

In a first mode of operation, the summer mode, the first air stream, exhaust air, which is represented by a continuous arrow in FIGS. 1–3, is fed into an inlet 3 of the first compartment, which inlet 3 is arranged in a first end of the lower housing unit 1, by a fan 11. The first air stream is then transferred through a filter 12, and then through an enthalpy exchange device 13, in which the two air streams exchange heat and moisture with each other. From said enthalpy exchange device 13 the first air stream is fed through a device 14 for evaporative cooling, direct or indirect, or indirect cooling, using water other coolant or refrigerant, and humidification in which said first air stream is cooled and humidified, and therefrom to the first compartment of the upper housing unit 2. In said first compartment the exhaust air is fed through a sensible heat exchanger 21 of cross flow or rotary type for exchange of heat only with the second air stream, then through a heater 22 and finally through a dehumidifier 23. The first air stream or only a portion of said first air stream, heated in said heater 22, is used to regenerate the dehumidifier 23, which preferably is a desiccant dehumidifier of rotor type. Said first air stream is then exhausted through an outlet 5 in the first compartment into the ambient air.

The second air stream, outdoor air, which is represented by a dashed arrow in FIGS. 1–3, is fed into an inlet (not shown) of the second compartment, which inlet is arranged in the second end of the lower housing unit 1, by a fan 24 (see FIG. 3). The second air stream is then transported through a filter 15 and from said filter 15 through the above-mentioned enthalpy exchanger device 13. Thereafter said second air stream is transferred to the second compartment of the upper housing unit 2 and through the dehumidifier 23, then through the heat exchanger 21 and finally through an additional heater 25 and an additional humidifier 26, respectively, before being exhausted through an outlet 6 in the second compartment into the building. Said heater 25 and said humidifier 26 is non-operable in summer mode of operation. Said humidifier 26 may be used as a second stage of cooling in this mode. In this case the humidifier 26 is replaced by a cooling device with no humidification properties.

The function of the sensible heat exchanger 21 is to exchange heat and no or very little humidity between the two air streams.

In the second mode of operation, the winter mode, the function of the sensible heat exchanger, the device 14 for cooling and humidification and the heater 22 and the rotation of the desiccant rotor 23 is disabled, and if the sensible heat exchanger is a cross flow heat exchanger 21 the first air stream is bypassed said heat exchanger through a duct 27 which can be closed by a damper (not shown) allowing the system to act as a heater and humidity recovery device utilizing the enthalpy rotor 13 only for this purpose.

However, if the temperature of the first air stream under these conditions is below about +3° C. after it has passed the heat exchanger 21 a certain amount of said air stream is transferred through the heat exchanger 21 to avoid that ice is formed on the heater 22, since said heater is not used in this mode of operation. Heater 25 and humidifier 26 are used in this mode of operation to heat and humidify the first air stream to comfort indoor conditions.

The two heaters 22,25 of the apparatus according to the invention use preferably district heating to heat first and second air streams, respectively. However, it is obvious for the man skilled in the art that other types of energy, in particular low cost forms, such as natural gas or solar heated water, or other waste heat sources, could be used for heating said heaters.

In different embodiments of the invention the enthalpy exchange device 13 could be an enthalpy wheel or a cross flow enthalpy exchanger block. Likewise, the device 14 could be a evaporative cooler or other type of cooling device using indirect cooling in which water, other cooling agent or refrigerant is used, and the heat exchanger 21 could be a sensible exchange wheel or a cross flow plate-type heat exchanger. Moreover, the humidifier 26 can in the summer mode of operation be replaced by a cooling device with no humidification properties and in the winter mode of operation by a humidifier with more or less no cooling properties.

Moreover, the dehumidifier 23 is preferably a desiccant rotor, but can be of any other type of dehumidifier.

In another embodiment of the invention the humidifier 14 and the sensible heat exchanger 21 could be replaced by a single dew point exchange device, i.e. an indirect evaporative cooler, which is used to cool the supply air.

In different embodiments of the invention the above-mentioned enthalpy exchange device, dehumidifier and heat exchanger are provided with means of capacity control, as is known by the artisan.

Moreover, in embodiments utilizing cross-flow rather than rotary heat exchanger or enthalpy exchange devices dampers (not shown) may be arranged to bypass air around these devices or groups of devices of which the exchangers are included as means of capacity control.

The advantage of the apparatus according to the invention is that it has very low energy consumption compared to known apparatus, that it provides individual control over humidity and cooling requirements and that it will work at higher ambient specific humidities than prior desiccant cooling type devices.

The method according to the invention will now be described first in connection the summer mode of operation.

The first air stream, exhaust air, is fed first, seen in the direction of flow of said air stream, through the inlet 3 of the first compartment of the lower housing unit 1 by the fan 11, whereupon it is transferred through the filter 12 and the enthalpy exchange device 13. Then said first air stream is transferred through the device 14 for cooling and humidification from which it is fed to the first compartment of the upper housing unit 2. In said upper housing unit 2 it is transferred through the cross flow heat exchanger 21, the heater 22 and the dehumidifier 23, where-upon it is exhausted through the outlet 5 into the ambient air.

The second air stream, outdoor air, is fed first, seen in the direction of flow of said air stream, through the inlet (not shown) of the second compartment of the lower housing unit 1 by the fan 24 and then through the filter 15 and the enthalpy exchange device 13. Therefrom said second air stream is transferred to the second compartment of the upper housing unit 2. In said upper housing unit 2 the second air stream is transferred through the dehumidifier 23, the cross flow heat exchanger 21, the additional heater 25 and the additional humidifier 26, whereupon it is exhausted through the outlet 6 into the building.

In the second mode of operation, the winter mode, the first air stream, exhaust air, is fed in the same way as in the first mode of operation except that said air stream does no pass through the heat exchanger 21 or a small amount is passed through said heat exchanger in the case the temperature of the said stream is below about +3° C. when the air stream reaches the heater 22 to avoid formation of ice on said heater, since it is not used in this mode of operation. The second air stream is transferred through the lower and upper housing units 1,2 in the same way as in the first mode of operation.

What is claimed is:

1. A method for heat and humidity exchange between two air streams, one of which being hot and humid, at least during a first part of the year, wherein a first of said air streams is fed from the interior of a building to the ambient air and a second of said air streams is fed from said ambient air to the interior of said building, whereby said first air stream is cooled and thereafter transferred through a heat exchanger, whereupon it is transferred to a heater and thereafter transferred through a dehumidifier before being exhausted to the ambient air, whereas said second air stream is transferred through said dehumidifier and thereafter through said heat exchanger, whereupon it is cooled in a cooling device before being transferred into the interior of said building, characterized in that said second air stream, before being fed to said dehumidifier, is caused to exchange heat and humidity with said first air stream before the latter is cooled.

2. Method according to claim 1, wherein said second air stream is, at least during a second part of the year, cooler and less humid in absolute terms than said first air stream, characterized in that said first air stream only is brought to exchange heat and humidity with said second air stream.

3. Method according to claim 2, characterized in that said second air stream is transferred through an additional heater after being transferred through said heat and humidity exchanger.

4. Method according to claim 3, characterized in that said second air stream is transferred through an additional humidifier before or after being transferred through said additional heater.

5. An apparatus for heat and humidity exchange between two air streams, one of which being hot and humid, at least during a first part of the year, and in which a first of said air streams is adapted to be fed from the interior of a building to the ambient air and a second of said air streams is adapted to be fed from said ambient air to the interior of said building, said apparatus comprises a housing (1, 2), divided into first and second compartments, means (11, 24) for transportation of the two air streams separately in said compartments, a device (14) for cooling and humidification of the first air stream, a sensible heat exchanger (21) for exchange of heat between the two air streams, a heater (22) for heating said first air stream, and a dehumidifier (23) for drying said second air stream, wherein said first air stream is adapted to be transferred through said dehumidifier (23) for regenerating said dehumidifier, characterized in that an enthalpy exchange device (13) is provided in said housing (1, 2) and adapted to treat said second air stream and said first air stream for exchange of heat and humidity between said air streams before said second air stream is transferred through said dehumidifier (23) and said first air stream is transferred through said device (14) for cooling and humidification, respectively.

6. Apparatus according to claim 5, wherein said second air stream is, at least during a second part of the year, cooler and less humid in absolute terms than the first air stream, characterized in that the heat exchanger (21) and the dehumidifier (23) is deactivated during this second part of the year, either by termination of the rotation of the heat exchanger or enthalpy exchanger, or by bypass of the air stream around said devices, or if the devices are stationary block-type devices via a series of dampers.

7. Apparatus according to claim 6, characterized in that an additional heater (25) is provided in the second compartment after said sensible heat exchanger (21) seen in the flow direction of the second air stream.

8. Apparatus according to claim 6, characterized in that an additional humidifier (26) is provided in the second compartment after said sensible heat exchanger (21) seen in the flow direction of the second air stream, wherein the additional humidifier (26), in the summer mode of operation, is a cooling device with no humidification properties.

9. Apparatus according to claim 5, characterized in that the enthalpy exchange device (13) is an enthalpy wheel.

10. Apparatus according to claim 5, characterized in that the enthalpy exchange device (13) is a cross flow enthalpy exchanger block.

11. Apparatus according to claim 5, characterized in that the sensible heat exchanger (21) is a sensible heat exchange wheel.

12. Apparatus according to claim 5, characterized in that the sensible heat exchanger (21) is a cross flow heat exchanger.

13. Apparatus according to claim 5, characterized in that a cooling device is provided in the second compartment after said heat exchanger (21) seen in the flow direction of the second air stream.

14. Method of control of the apparatus according to claim 6, characterized in that humidity control is accomplished by control of one or more of the following devices, the heater (22), the speed of the desiccant dehumidifier rotor (23), the humidifier (26) or the enthalpy exchanger (21), and that temperature control is achieved by control of one or more of the following devices, the heater (25), the sensible exchanger (21), humidifier (14), the additional humidifier (26) or the enthalpy exchanger (13).

* * * * *